United States Patent Office 3,317,593
Patented May 2, 1967

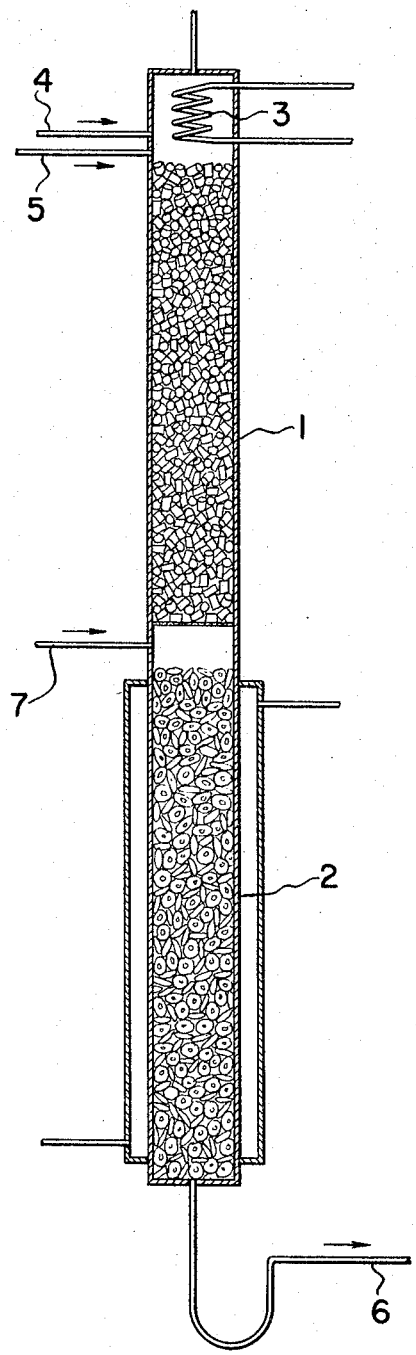

3,317,593
PROCESS FOR THE HYDROLYSIS OF ALKANOL DERIVATIVES
Eduard Enk and Hellmuth Spes, Burghausen, Upper Bavaria, Germany, assignors to Wacker-Chemie G.m.b.H., Bavaria, Germany, a corporation of Germany
Filed Mar. 31, 1964, Ser. No. 356,291
Claims priority, application Germany, Apr. 11, 1963, W 34,292
4 Claims. (Cl. 260—540)

This invention relates to the hydrolysis of alkanol derivatives, and it has for its object to provide a novel and improved process for this purpose.

Another object of the invention is to effect a substantially complete hydrolysis of the foregoing organic compounds without the formation of azeotropic mixtures, thus saving the time and expense involved in separating the components of such mixtures in prior art processes of hydrolytic dissociation.

Still another object is to increase the efficiency of hydrolytic reactions by continuously removing the hydrolytic dissociation products from the reaction zone while retaining the hydrolyte in said reaction zone in vapor form, and thus, by shifting the hydrolysis equilibrium in the direction of complete hydrolysis, to obtain a substantially complete conversion of the hydrolyte in a single pass.

Various other objects and advantages will be apparent as the nature of the invention is more fully disclosed.

It is known to crack hydrolyzable organic oxygen compounds such as, for example, esters, acetals, or ketals, in the presence of acid catalysts, like mineral acids or cation exchangers, with water, into alcohol and the appropriate organic residue. In all cases the reaction can be carried out only up to the hydrolysis equilibrium. The hydrolysate in equilibrium, consisting of the starting substance, water, alcohol and a second cracking product which, depending upon the starting substance, is an acid, an aldehyde or a ketone, is then separated into its components.

Since due to the unfavorable hydrolysis equilibrium, which for instance under stoichiometric conditions for methyl acetate means only about 30% conversion—a comparatively large quantity of methyl acetate is present in the hydrolysate which with methanol form an azeotropic mixture in the proportion of about 4:1, the larger part of the methanol can be obtained only in the form of the azeotropic mixture from which it must be separated for instance by extractive distillation or extraction with, say, water, saline solutions or glycols. The ester thus obtained as a distillate is re-circulated into the hydrolysis. The methanol is obtained from the extract by distillation. The processing of the azeotropic mixture and the circulation of large quantities of methyl acetate consume a great deal of energy and materially increase the cost of the process.

We have now discovered a process for the hydrolysis of alkanol derivatives in the presence of cation exchangers which, by removing both reaction products and retaining the starting substance (the hydrolyte) in the reaction chamber, permits the shift of the equilibrium in the direction of complete hydrolysis and thus makes possible an almost 100% transformation without circulation of the starting substrate and without forming an azeotropic mixture, with a single pass. The process is characterized by the fact that the water-containing liquid phase flowing downward in the ion exchanger bed and perhaps containing the second cracking product is used for the extraction of the obtained alkanol, and the starting substance is kept in the rising vapor phase until the transformation is complete.

It has been found to be useful if the liquid phase enriched with alkanol is piped to the top end of an extraction column connected with the bottom of an ion exchanger column and the extraction column is heated in such a manner that the starting material remains in the reaction zone in its vapor form, while the hydrolysis products are drawn off at the bottom of the extraction column. One obtains in this manner by a single pass a mixture, largely free of the starting substance consisting of alkanol, perhaps a second cracking product and water, which can be split into its components by simple distillation or extraction.

The invention is described in connection with the accompanying drawing which is a diagrammatic illustration of apparatus suitable for performing the process.

The apparatus shown in the drawing consists of an ion exchanger column 1 which, for example, is filled with cylindrical filler bodies containing an ion exchanger as the hydrolysis, and of a jacket-heated extraction column 2 with Raschig ring filling. The ion exchanger column 1 is vented through a small reflux condenser 3. The starting substance (the hydrolyte) and water are introduced in the desired proportion through conduits 4 and 5, respectively. The ion exchanger column 1 is kept by external heating and, if desired, by adding the reaction partners in vapor form, at a temperature sufficient to hold part of the reaction mixture, i.e. particularly the starting substance, in vapor form, without any significant recirculation existing in the reflux condenser 3. In case of methyl acetate the reaction temperature is between 60 and 100° C. The hydrolysate flows from the ion exchanger column 1 into the extraction column 2 which is so heated that the runoff through conduit 6 is practically free of the starting substance. The runoff hydrolysis products can be split up into their components in the usual manner by distillation, extraction, etc. without incurring the danger of a counter-reaction since no catalyst is present. For instance, from the hydrolysis products obtained one can separate alcohol in one column and water in another column by distillation or extraction, and such water can be returned without condensation in vapor form through conduit 5 into the ion exchanger column 1. In this work method it is necessary to add for hydrolysis only the stoichiometrically required quantity of water. Moreover, less heat has to be supplied to column 2.

It is also possible to install an advance column before the alcohol column to remove traces of the starting substance, if any, from the runoff of column 2, or to use other additional equipment which does not change the principle of the apparatus described above.

The ion exchanger filling of column 1 should be such as to insure a free flow of liquid downward as well as of a stream of vapor upward, because both streams promote the shift of the equilibrium in the direction of complete hydrolysis.

Useful as ion exchanger beds are cages and ion exchangers laid on floors, if care is taken that the latter cannot be washed away. Particularly suitable are porous shaped bodies or floors where the ion exchanger is bedded down in accordance with the process disclosed in Hellmuth Spes et al. appln. Ser. No. 297,963, filed July 26, 1963.

The liquid phase in the upper part of the ion exchanger column 1 consists principally of water, and while running downward it is enriched with alcohol and perhaps with the second splitting product, while the vapor phase rising upward, consisting of the starting substance, some alcohol and perhaps a second splitting product, loses the alcohol content by extraction with the liquid phase. Thereby the hydrolysis equilibrium is continuously shifted in the direction of the hydrolysis, so that the transformation becomes quantitative.

In the process of the invention it is also possible to process alkanol derivatives which contain the alcohol corresponding to the alcohol component of said derivative. Thus, for instance, one can hydrolyze the methyl acetate-methanol mixtures obtained during polyvinyl acetate saponification directly, without separating the methanol. In that case the mixture is added through conduit 7, where in the case of high alcohol content the lead-in may occur lower down, and in the case of low alcohol content, higher up.

It is a substantial advantage of the invention that all the water is first available for shifting the hydrolysis equilibrium, and only thereafter it assumes the function of an extraction medium for the alcohol. Thereby it is possible to get by with considerably less water than when the extraction and hydrolysis are performed separately. In general a weight proportion of about 1:1 to 1:2 between the starting substance and water is sufficient.

Besides the hydrolysis of esters, the process is also suitable for the hydrolysis of other alkanol derivatives, as for instance acetals or ketals. In each case the process of the invention has the effect that the starting material is held back in the ion exchanger column until the transformation is complete, while the hydrolysis products are drawn off from the apparatus.

Example 1

An ion exchanger column 1 which is 2 m. high with a diameter of 80 mm. is filled with 10 liters of cylindrical, porous polyethylene fillers with 10–15 mm. diameter containing 120 g./l. of a cation exchanger commercially available under the trade name Amberlite IR 120, in H- form. At the lower end of the column there is a jacket-heated extraction column 2 which is 2 m. high and has a diameter of 80 mm. The ion exchanger column 1 carries a small reflux condenser 3.

The reflux condenser adds 1800 g. methyl acetate and 3600 g. water per hour. The temperature in column 1 is 60–80° C. The jacket of the extraction column 2 is kept at 112° C. 5400 g. mixture of 14.3% methanol, 58.7% water, 26.8% acetic acid and less than 0.3% methyl acetate runs off through conduit 6 at the lower end every hour. The transformation of methyl acetate is 99.4%.

The hydrolysis product at a temperature of 84° C. is separated in another column into 790 g. distillate per hour containing 97.8% methanol, 1.4% methyl acetate and 0.8% water, as well as into 4610 g. of 31.4% acetic acid which is free of ester and methanol. The acetic acid is then concentrated by the usual method either by extraction or by distillation.

Example 2

Example 1 is repeated under conditions which are otherwise identical, with the exception that the water addition at the head of the ion exchanger column 1 is replaced by the water vapor distilled off from the distillative acetic acid concentration still containing 2% acetic acid. The heating of the extraction column is thereby reduced considerably. The same transformation as in Example 1 is obtained.

Example 3

Example 1 is repeated, with the difference that the water running in at the head of the ion exchanger column, by heat exchange with the diluted acetic acid running off the methanol column, has a temperature of 90° C. It is necessary to heat the extraction column just a little to maintain the temperature. The result is the same as in Example 1.

Example 4

The cylindrical filler bodies of the ion exchanger column 1 in Example 1 are replaced by the same weight of 2 cm. thick, porous polyethylene floors in which equal weight parts of an ion exchanger, commercially available under the name of Amberlite IR 120, are bedded in. The floors each contain two gas apertures 15 mm. wide. This filling yields the same transformation as in Example 1.

Example 5

The apparatus consists of an ion exchanger column 1 which is 2 m. high and has a diameter of 80 mm. with reflux condenser and a 2 m. long jacket-heated extraction column 2 arranged underneath with a 27 mm. diameter with discharge over a syphon. The ion exchanger column 1 is filled with 10 liters of porous polyethylene cubes of 1 cm. size which contain 120 g./l. of a cation exchanger which is commercially available under the name Amberlite IR 120, in acid form. The extraction column 2 contains 6 mm. size Raschig rings.

At the head of the ion exchanger column 3000 g. of hot water and 1500 g. ethyl acetate are piped in per hour. 4500 g. of ester-free mixture consisting of ethanol, water and acetic acid, run off per hour from the extraction column 2 which is heated to 116° C. by circulating oil. Conversion is 100%. The alcohol is separated from the mixture in another column and the diluted acetic acid is concentrated in the usual manner by extraction or distillation.

The same result is obtained when the filler bodies, instead of being Amberlite IR 120, contain other cation exchangers which are commercially available under the name Lewatit S 100 or Permutit RS.

Example 6

The apparatus consists of the same ion exchanger column 1 as in Example 5 and an extraction column 2 which is 3 m. high, whose lower two-thirds has a diameter of 27 mm. and the upper third a diameter of 50 mm. The extraction column is filled with 13 mm. Raschig rings.

1800 g. of hot water and 1800 g. ethyl acetate are piped in at the head of column 1 per hour. 3600 g. of a mixture of 3.5% ethyl acetate, 24.3% ethanol, 31.7% acetic acid and 40.5% water runs off per hour from the extraction column 2 which is heated to 140° C. by circulating oil. The conversion is 93%. After the ethyl acetate in the form of an azeotropic mixture with 8.5% ethanol has been separated by means of an advance column, the now ester-free mixture is processed as in Example 5.

Example 7

1660 g. methyl propionate and 5000 g. water are piped in each hour at the head of the apparatus described in Example 1. The jacket of the extraction column 2 is heated to 118° C. At the lower end of the extraction column the hourly runoff is 6660 g. of a mixture containing 8.7% methanol, 20.3% propionic acid, 0.8% methyl propionate and the balance water. The conversion is 96.8%.

The mixture is processed by known methods of distillation and extraction.

Example 8

In the same manner as in Example 7 one can crack 1660 g. isobutyl formate in the presence of 3600 g. of water per hour. The conversion is 96.0%. The same transformation is obtained by the hydrolysis of 1660 g. isopropyl acetate per hour.

Example 9

The apparatus described in Example 1 is used for the hydrolysis of 1800 g. methylal with 3600 g. water per hour. The heating jacket is kept at 105–110° C. The runoff mixture contains less than 0.5% methylal. The mixture is processed by distilling off the methanol from the remaining formalin solution.

Example 10

In the apparatus of Example 1, 1600 g. diethoxymethane are hydrolyzed every hour with 3000 g. water. The heating jacket of the extraction column is kept at 115–

120° C. The hourly runoff from the extraction column is 4600 g. of a mixture containing less than 0.4% diethoxymethane. The mixture is processed in the usual manner by distilling.

*Example 11*

In the apparatus of Example 1 the filler bodies containing the ion exchanger are replaced by 40 overflow floors which are filled with 6500 g. of the cation exchanger Merck I (strongly acid) in H-form. The cation exchanger is kept in place by sieves.

Between the ion exchanger column and the extraction column 1800 g. of a methyl acetate-methanol mixture with 20% methanol and 3000 g. of water are piped per hour. The heating jacket of the extraction column is kept at 116° C. 4800 g. of a mixture with less than 0.1% methyl acetate runs off from the extraction column per hour. The processing of the mixture is done by distilling off the methanol and subsequent azeotropic removal of the water from the acetic acid with isopropyl acetate as the entrainer.

*Example 12*

In the apparatus of Example 1, 1800 g. of a 50% methyl acetate-methanol mixture as obtained during re-esterification of polyvinyl acetate with methanol, is hydrolyzed with 1800 g. of water. The mixture is piped in between the two columns. The extraction column 2 is kept at 115–120° C. The mixture (5600 g./hour) running off through conduit 6 is practically ester-free and is processed in the usual manner.

*Example 13*

In the same manner as in Example 9, 1500 g. acetone dimethyl acetal is hydrolyzed with 3600 g. of water per hour. The heating jacket of column 2 is kept at 105–110° C. The mixture running off is practically free of the starting material and is processed in the usual manner by distilling.

*Example 14*

In the apparatus as in Example 1 an eliminator section 1 m. high and with a diameter of 40 mm. is placed upon the reflux condenser. 1600 g. acetaldehyde-dimethylacetal and 3000 g. water are piped into the ion exchanger column per hour. The heating jacket of column 2 is kept at 105–115° C. and the reflux condenser is cooled with water at a temperature of 30° C. The mixture running off (3810 g./hour) is practically free of any starting material. The acetaldehyde obtained is drawn off by distillation at the head of the system through the discharge or elimination section.

The invention claimed is:
1. Process for the hydrolysis of alkanol derivatives selected from the group consisting of esters, acetals and ketals in the presence of a cation exchanger, which comprises flowing the hydrolyte and water downwardly through a cation exchanger in a reaction zone at a temperature sufficient to vaporize said hydrolyte in said reaction zone, flowing the water-containing liquid hydrolysate from said reaction zone downwardly through an extraction zone, running off the substantially hydrolyte-free liquid hydrolysis products from said extraction zone, and separating the liquid so discharged from said extraction zone into its components to obtain the individual hydrolysis products, said process being characterized by the fact that the contents of said extraction zone are heated above the vaporization temperature of said hydrolyte so that said hydrolyte remains in the vapor phase and rises in said reaction zone until the reaction is completed.

2. Process according to claim 1, characterized by the fact that the hydrolyte and water are admitted to said reaction zone in vapor form.

3. Process according to claim 1, characterized by the fact that the water separated from the liquid discharged from said extraction zone is returned to said reaction zone.

4. Process according to claim 1, characterized by the fact that the alkanol derivative to be hydrolyzed contains the alcohol corresponding to the alcohol component of the alkanol derivative.

References Cited by the Examiner
UNITED STATES PATENTS
2,936,321   5/1960   Mercier _____ 260—540

LORRAINE A. WEINBERGER, *Primary Examiner.*

V. GARNER, *Assistant Examiner.*